United States Patent [19]

Justice

[11] Patent Number: 4,971,690

[45] Date of Patent: Nov. 20, 1990

[54] WASTE WATER DRAINAGE AND RECOVERY SYSTEM

[76] Inventor: Donald R. Justice, P.O. Box 458, Matlacha, Fla. 33909

[21] Appl. No.: 346,461

[22] Filed: May 2, 1989

[51] Int. Cl.$^5$ .............................................. E02B 13/00
[52] U.S. Cl. .................................... 210/170; 210/258; 210/532.2; 405/36
[58] Field of Search ................ 210/170, 202, 258, 259, 210/532.2, 747, 532.1; 405/36, 43

[56] References Cited

U.S. PATENT DOCUMENTS

| | | | |
|---|---|---|---|
| 292,046 | 1/1884 | Powers | 210/532.2 |
| 2,795,542 | 6/1957 | Horne et al. | 210/747 |
| 3,306,447 | 2/1967 | Medeiros | 210/202 |
| 3,933,641 | 1/1976 | Madden et al. | 210/258 |
| 4,313,692 | 2/1982 | Johnson | 405/43 |
| 4,721,408 | 1/1988 | Hewlett | 405/36 |
| 4,824,572 | 4/1989 | Scott | 210/259 |
| 4,865,069 | 9/1989 | Lacey | 405/36 |

FOREIGN PATENT DOCUMENTS

| | | | |
|---|---|---|---|
| 3508885 | 12/1985 | Fed. Rep. of Germany | 210/532.1 |
| 0591559 | 2/1978 | U.S.S.R. | 405/36 |
| 0681222 | 8/1979 | U.S.S.R. | 405/36 |
| 1157166 | 5/1985 | U.S.S.R. | 405/36 |
| 1288268 | 2/1987 | U.S.S.R. | 405/36 |

*Primary Examiner*—Frank Spear
*Assistant Examiner*—Joseph Drodge
*Attorney, Agent, or Firm*—Fleit, Jacobson, Cohn, Price, Holman & Stern

[57] ABSTRACT

Waste water from a residence flows to an on-site waste water treatment facility, such as a septic tank. The leachate passing from the septic tank flows to a chlorine-contact chamber for treating the waste water from the septic tank with chlorine. The treated waste water flows from the contact chamber to a drainage field located below ground level. Percolating sand and a natural filter media filter the treated waste water which is distributed by the drainage field. A perforated water recovery pipe is located below the filter media to collect the treated and filtered water. A suction pump pumps water collected in the recovery pipe to above ground level. A sprinkler connected to the suction pump distributes water pumped from the recovery pipe for irrigating the ground surface.

15 Claims, 4 Drawing Sheets

WASTE WATER DRAINAGE AND RECOVERY SYSTEM

FIELD OF THE INVENTION

This invention relates to the field of recovery of filtered waste water which is reused for domestic or commercial irrigation.

BACKGROUND OF THE INVENTION

To provide drinking water in most areas of the United States, water is taken from aquifers located deep within the ground. The water is brought to a treatment facility where it is made potable by extensive treatment processes. The potable water then is pumped through water distribution systems to the end user.

After the water is used, it then flows by gravity from the end user through a central sewage collection system into sewer pump stations that pump the waste water to a sewer treatment facility where the water, after an extensive treatment process, is disposed of through canals and rivers. In some cases, the extent of treatment of the waste water is sufficient that the treated waste water is pumped back to the end user through an extensive piping system so that this treated water can be reused for irrigation purposes.

SUMMARY OF THE INVENTION

By the system of the present invention, the need is eliminated for a central gravity sewer or forced sewer collection system. Further, the system greatly reduces the size and need for both water and sewer treatment facilities. The system also eliminates the need for the installation of a reuse water conveyance system from a treatment facility for treated waste water back to sprinkler systems or irrigation systems of the end user.

By the present invention, potable water is delivered to a household. This water is used, flowing by gravity, to an on-site treatment facility such as a septic tank. The solids are collected at one end of the septic tank and when the liquids build up to a sufficient height, they run over a weir into the other end of the septic tank. From there, the liquids flow out through an opening to a chlorine-contact chamber that ensures killing of any bacteria present in the leachate from the septic tank.

This treated water flows from the chlorine-contact chamber by gravity into a drain field, down through percolating sand and into natural filter media which is the earth. The water then flows downward and into the existing water table.

The recovery system of the present invention is installed adjacent to the septic tank and drain field at a distance of some 14 to 20 feet below the drain field. The treated water percolating down through the natural filter media (earth) flows into the pre-existing water table and then into a recovery pipe and is brought back to the surface by a pump. The treated water is passed through a mineral remover or any additional device which is necessary to bring the water to an acceptable state for irrigation purposes. The recovered water is used through a sprinkler system for irrigation purposes.

As an example, 50% of the water used in the State of Florida is used for domestic or commercial irrigation and in most cases, this water is potable water which has been through an extensive and expensive treatment facility. The extensive treatment of water suitable for irrigation is not necessary when using the present invention. This system eliminates the use of potable water for irrigation purposes. The system also eliminates 50% of the water that is supplied to households and is paid for through a meter because the irrigation water that constitutes 50% of that household's water use would now be taken from the ground water that exists adjacent to a home site and which is constantly supplemented through the on-site treatment facility (septic tank).

Advantageously, the system would also greatly decrease the size of water treatment facilities needed for future population expansion. The system taps a vast unused resource of ever-present ground water and removes the strain from potable water aquifers that are constantly overworked due to the population explosion that has occurred, for example, in the State of Florida over the last ten years.

It is an object of the present invention to recover waste water in a form suitable for irrigation and sprinkler systems.

It is another object of the present invention to recover waste water in a form suitable for irrigation and sprinkler systems where waste water recovered from a septic tank and a chlorine-contact chamber flows through a drain field and is recovered from below the drain field.

It is still another object of the present invention to recover waste water in a form suitable for irrigation and sprinkler systems where waste water recovered from a septic tank and a chlorine-contact chamber flows through a drain field and is recovered from below the drain field and a water recovery pipe located below the drain field collects water which is pumped to above ground level and distributed to an irrigation or sprinkler system.

These and other objects of the invention, as well as many of the intended advantages thereof, will become more readily apparent, when reference is made to the following description taken in conjunction with the accompanying drawings.

DETAILED DESCRIPTION OF THE PREFERRED EMBODIMENTS

Figure 1:
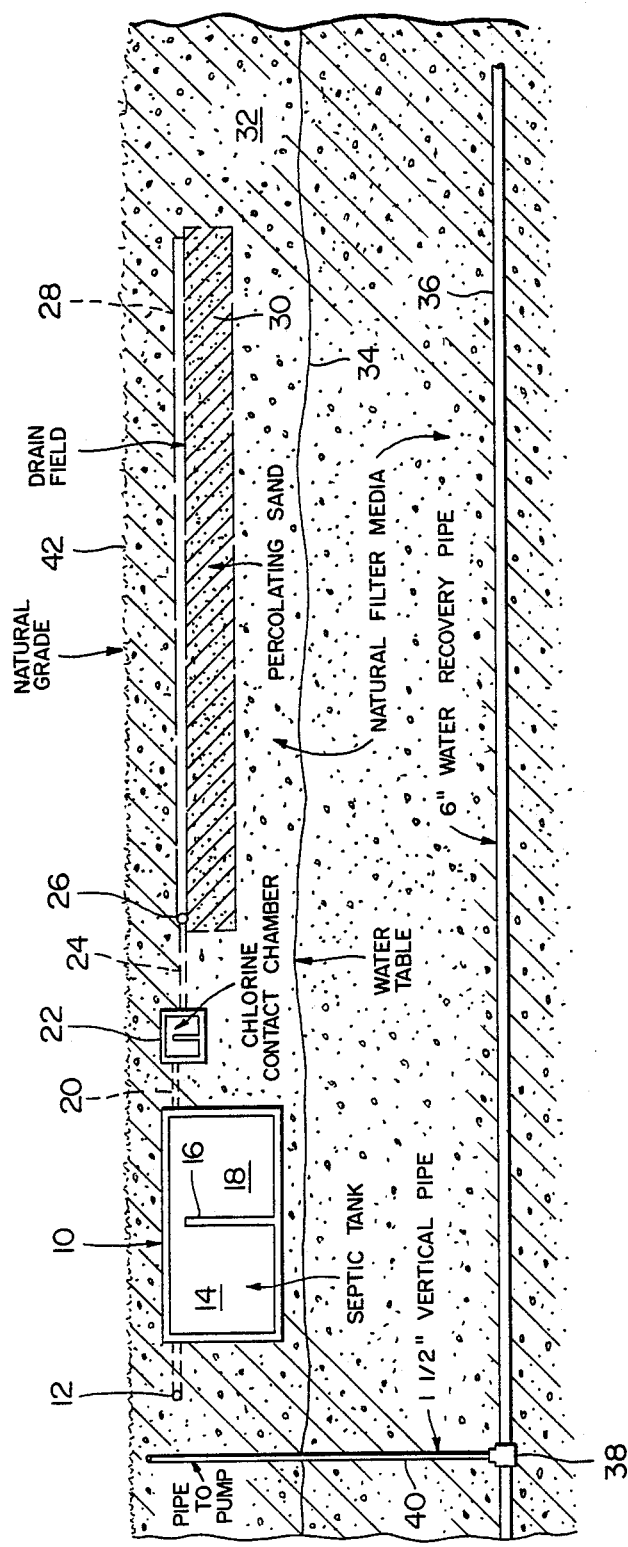
FIG. 1 is a cross-sectional view of the waste water drainage and recovery system of the invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
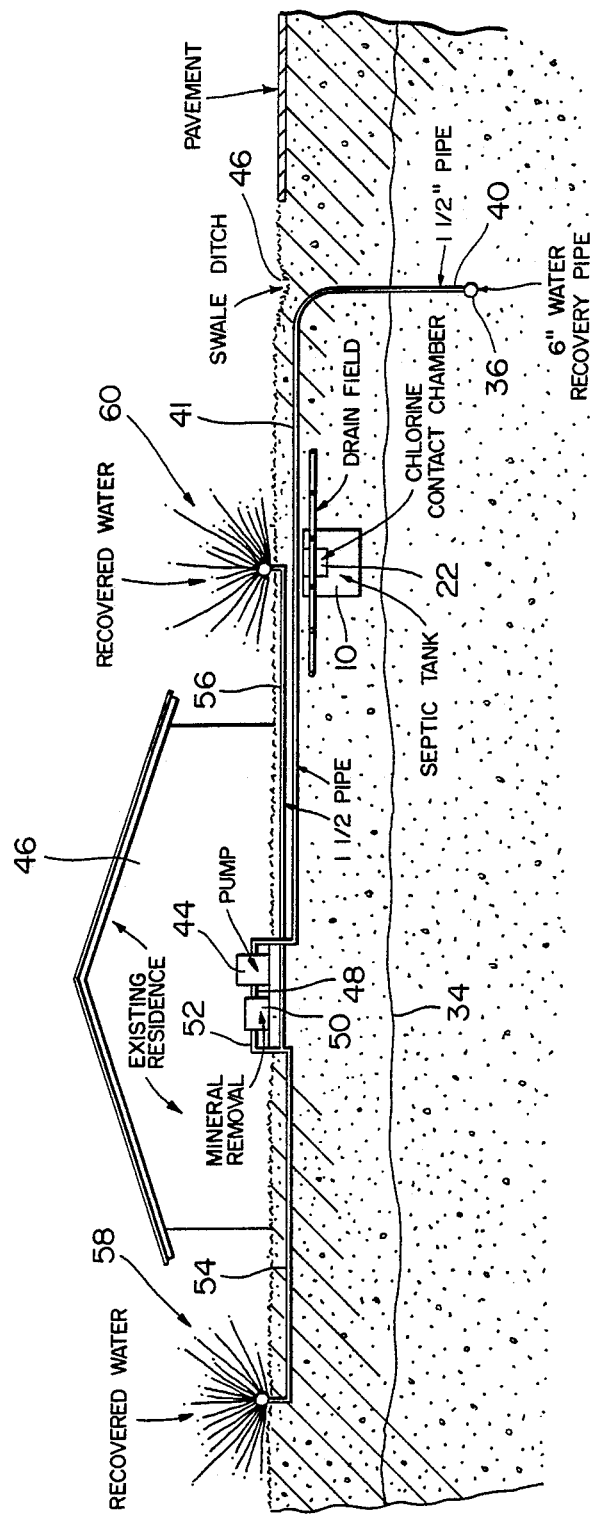
FIG. 2 is a longitudinal sectional view of the waste water drainage and recovery system.
Figure 3:
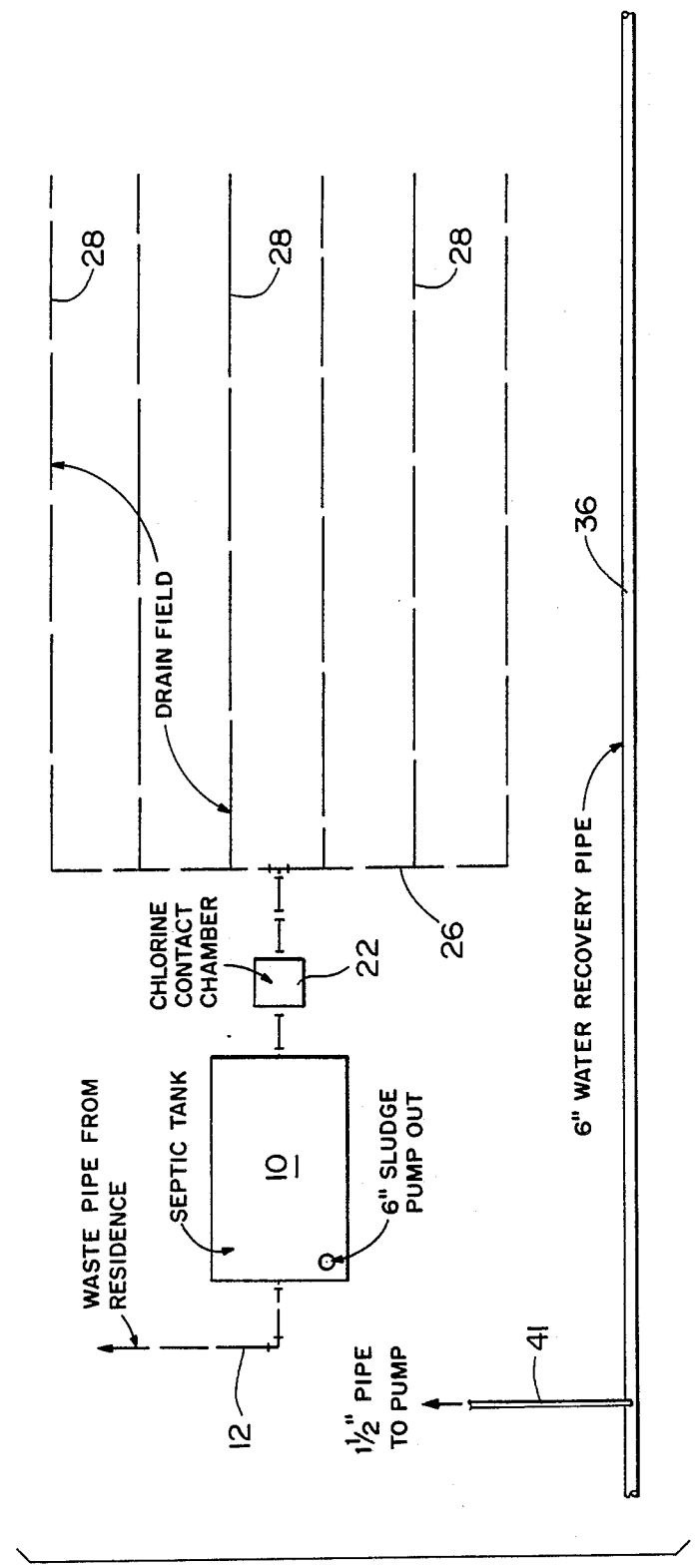
FIG. 3 is a plan view of the waste water drainage and recovery system.

With reference to the drawings, in general, and to FIGS. 1–3, in particular, a waste water drainage and recovery system embodying the teachings of the subject invention is shown. With reference to the orientation of the system in FIG. 1, the system includes a septic tank 10 connected to a residence. An inlet pipe 12 brings waste water from the residence into the septic tank 10.

Solids are collected in section 14 of the tank 10. When the liquids build up, they run over weir 16 into section 18 of the tank.

As the liquids continue to build, they flow out of the tank from section 18 through pipe 20 into chlorine-contact chamber 22. Chlorine in this contact chamber destroys any bacteria present in the leachate flowing through pipe 20 into the contact chamber 22.

The water from the chlorine-contact chamber flows through outlet pipe 24 to distribution pipe 26. Emanating from distribution pipe 26 are a series of fingers or pipes 28, as best shown in FIG. 3. The pipes 28 are perforated so as to allow the leachate to flow through the pipes 28 forming a drain field.

Located below the pipes 28 is a layer of percolating sand 30 through which the leachate flows. The percolating sand acts as a filter to remove larger size particles contained in the leachate. Continued filtration of the leachate is achieved by passing through a natural filter media, being the earth 32, located below the percolating sand until reaching the water table 34. Continued filtration through the earth 32 is achieved with the filtered leachate mixed with the naturally occurring water table.

In pre-existing homes with a septic tank sewage system, the chlorine-contact chamber 22 is added and a horizontally extending perforated water recovery pipe 36 is installed 14 to 20 feet below the drain field off to one side of the drain field as shown in FIG. 3. However, in new construction, it is possible to lay the perforated water recovery pipe 36 directly below the drain field.

The pipe 36 extends along the side of the drainage field and along the entire length of a side of the land upon which the home exists. At a T-connection 38, a vertically rising 1½" pipe portion 40 extends to a distance 6 inches to 12 inches below the natural grade 42 and travels horizontally underground by pipe portion 41 until connecting with a suction pump 44. Pump 44 draws water through pipe 36, pipe section 40 and pipe section 41 to the above ground location of the pump 44 which is located adjacent to the existing residence 46. Water is transferred from the pump 44 through pipe 48 to a mineral remover 50 which removes minerals accumulated in the naturally occurring water of the water table to a degree sufficient to use the pumped up water for irrigation and sprinkler purposes.

The water is transferred from the mineral remover 50 through a pipe 52 which splits into pipe sections 54 and 56, having a diameter of 1½ inches, until reaching above ground sprinklers 58 and 60, respectively. The sprinklers, two of which are shown in FIG. 2, and three of which for each home are shown in FIG. 4, spray treated and recovered water onto the lawn of the residence.

The use of recovered water for sprinkling of lawns saves the homeowner usage of 50% of the potable water normally conveyed to the residence. This vast reduction in the use of potable water at each residence greatly reduces a community's need for sewage treatment facilities and sewer systems to convey waste water to a treatment facility.

Normally, one of the sprinklers 60 is located above the drain field so as to aid in moving the leachate through the percolating sand 30 and natural filter media 32 formed by the earth. The additional water delivered over the drain field conveys the leachate in a more rapid manner.

Figure 4:
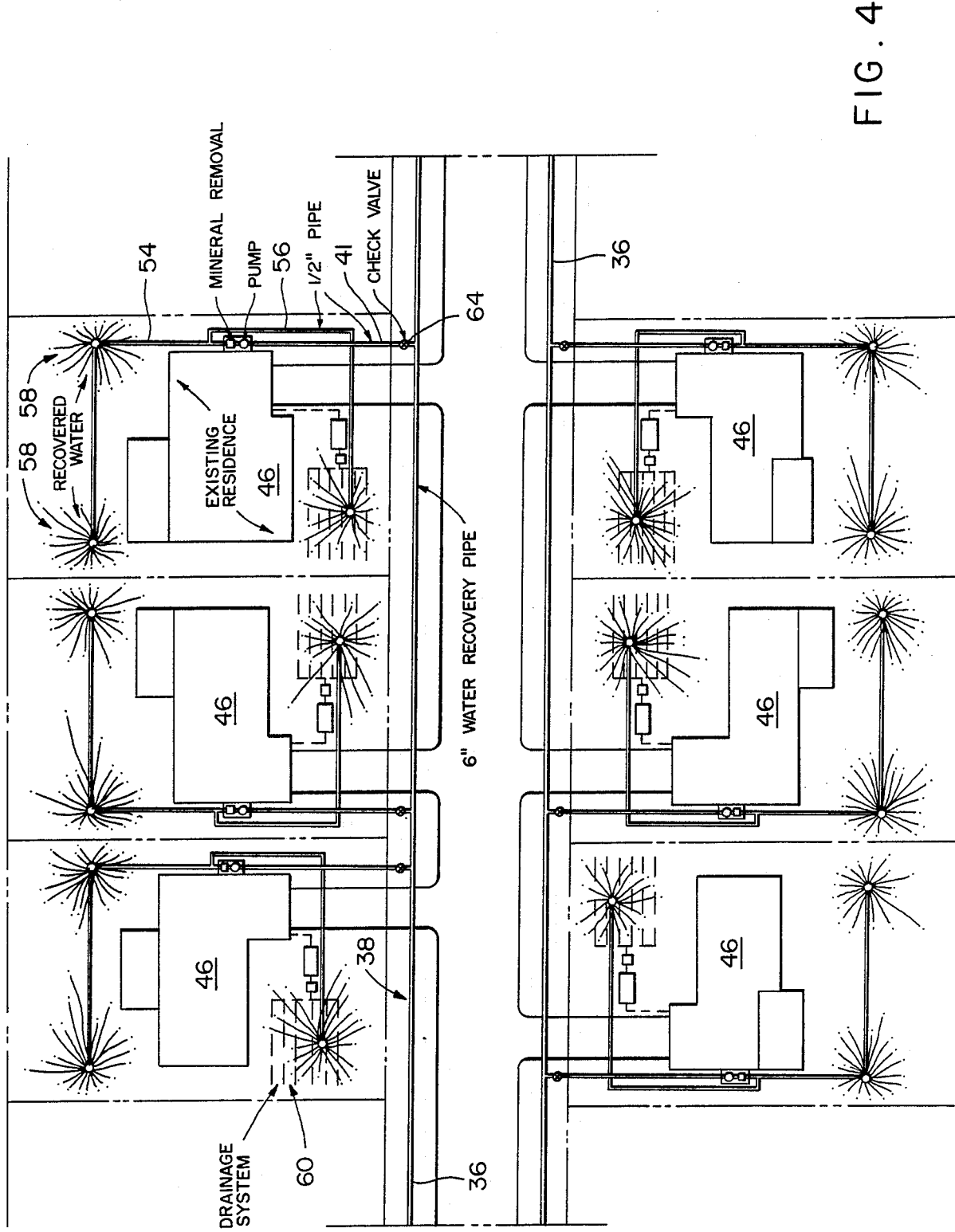
FIG. 4 is a typical site plan for a development of homes implementing the waste water drainage and recovery system.

In FIG. 4, a community development is shown with a series of existing residences 46. The system of the present invention may be implemented in this community by burying of a continuous water recovery pipe 36 some 14 to 20 feet below the pre-existing swale ditch 38 which extends in front of the residences 46 for run-off of rain water and excess sprinkler water. A one-way check valve 64 is located in the pipe portion 41 of each house which runs to the pump 44 so as to prevent recovered water from flowing back through pipe section 40 to the recovery pipe 36.

Therefore, by the addition of a chlorine-contact chamber and the pump and mineral remover located at the side of a house with the necessary piping 36, 40, 41, 48, 52, 54, 56 and sprinklers 58 and sprinklers 60 over the drainage field, a vast untapped resource is used in the place of potable water which has undergone expensive treatment and transporting to a residence through an extensive piping system. Pre-existing systems encounter less of a strain and in new developments, reduced requirements would prevent the need for extensive drainage and potable water transporting systems as well as the need for new water treatment and waste water treatment facilities.

Having described the invention, many modifications thereto will become apparent to those skilled in the art to which it pertains without deviation from the spirit of the invention as defined by the scope of the appended claims.

I claim:

1. A waste water drainage and recovery system comprising:

sewage collection means located underground for collecting waste water, drainage field means for distributing over an expansive area of naturally occurring earth and into the earth the waste water collected by said sewage collection means, filter means including a layer of filter media formed by the naturally occurring earth and being located below said drainage field means for filtering waste water distributed by said drainage field means, recovery means located below ground, below said filter means and below the naturally occurring water table for collecting water filtered by said filter means, said recovery means being separated from said drainage means by said layer of filter media, pump means for pumping water collected below ground in said recovery means to above ground, and irrigation means for distributing water on the ground pumped by said pump means from said recovery means.

2. A waste water drainage and recovery system according to claim 1, wherein said sewage collection means is a septic tank buried below a natural grade and connected to a residence.

3. A waste water drainage and recovery system according to claim 2, wherein said filter means includes percolating sand.

4. A waste water drainage and recovery system according to claim 3, wherein said recovery means includes a perforated pipe extending horizontally.

5. A waste water drainage and recovery system according to claim 4, wherein said perforated pipe is located 14 to 20 feet below the natural grade of the earth.

6. A waste water drainage and recovery system according to claim 2, wherein a chlorine contact chamber is located between said septic tank and said drainage field means.

7. A waste water drainage and recovery system according to claim 1, wherein said irrigation means includes a sprinkler for spraying of water.

8. A waste water drainage and recovery system according to claim 7, wherein said sprinkler is located above said drainage field means.

9. A waste water drainage and recovery system according to claim 8, wherein said sprinkler is directly over said drainage field means.

10. A waste water drainage and recovery system for a residence, said system comprising:
  a septic tank connected to the residence for collection of waste water,
  a chlorine contact chamber for treating with chlorine waste water flowing from said septic tank,
  drainage field means for distributing treated waste water flowing from said contact chamber over an expansive area of the naturally occurring earth,
  filter means including a layer of filter media formed by naturally occurring earth and being located below said drainage field means for filtering treated waste water distributed by said drainage field means,
  a perforated water recovery pipe located below said filter means and below the naturally occurring water table for collecting water passing through said filter means,
  a pump for pumping water collected in said recovery pipe to above ground level, and
  irrigation means to distribute water pumped by said pump from said recovery pipe and for irrigating the ground.

11. A waste water drainage and recovery system according to claim 10, wherein said recovery pipe is located to one side of said drainage field means.

12. A waste water drainage and recovery system according to claim 10, wherein said irrigation means is located above and directly over said drainage field means.

13. A waste water drainage and recovery system according to claim 10, wherein said filter means includes percolating sand and a natural filter media.

14. A waste water drainage and recovery system according to claim 10, wherein said recovery pipe is located 14 to 20 feet below a natural grade of the ground.

15. A waste water drainage and recovery system according to claim 11, wherein said septic tank is buried adjacent to the residence.

* * * * *